United States Patent [19]

Baer

[11] Patent Number: 4,671,406

[45] Date of Patent: Jun. 9, 1987

[54] CONVERTIBLE TENNIS BALL CONTAINER

[76] Inventor: Steven H. Baer, 15 Elm Way, Cooper City, Fla. 33026

[21] Appl. No.: 795,043

[22] Filed: Nov. 4, 1985

[51] Int. Cl.⁴ .................... B65D 25/18; B65D 51/22; B65D 85/58

[52] U.S. Cl. .................. 206/315.9; 215/13 R; 220/90.4; 220/258; 220/425; 220/447

[58] Field of Search .......... 206/315.9; 150/52 A; 220/90.2, 90.4, 258, 212, 445, 447, 425; 229/75; 215/1 A, 13 A, 13 R, 12 A; 273/61 D

[56] References Cited

U.S. PATENT DOCUMENTS

| | | | |
|---|---|---|---|
| 2,591,578 | 4/1952 | McNealy et al. | 220/447 |
| 2,828,903 | 4/1958 | Adkins | 220/447 |
| 3,233,727 | 2/1966 | Wilson | 273/61 D X |
| 3,275,180 | 9/1966 | Optner et al. | 220/447 X |
| 3,419,181 | 12/1968 | Stec | 220/258 |
| 4,054,205 | 10/1977 | Blow, Jr. et al. | 206/217 |
| 4,164,284 | 8/1979 | Witt et al. | 215/12 A X |
| 4,384,646 | 5/1983 | Sakamoto et al. | 206/315.9 |
| 4,415,097 | 11/1983 | Meins | 220/90.4 |
| 4,427,123 | 1/1984 | Komeda et al. | 215/13 R |
| 4,444,324 | 4/1984 | Grenell | 215/13 R X |
| 4,453,646 | 6/1984 | Harrild | 220/258 |
| 4,466,553 | 8/1984 | Zenger | 220/258 X |
| 4,478,346 | 10/1984 | Spong | 220/90.2 |

Primary Examiner—William Price
Assistant Examiner—Sue A. Weaver
Attorney, Agent, or Firm—John Cyril Malloy

[57] ABSTRACT

A container designed for the containment and storage of a plurality of tennis balls defining a package for retail sale thereof specifically structured to be convertible, after removal of the tennis balls, into a vessel for the storage and drinking of a liquid in a thermally insulated storage space. A cylindrical housing having the appearance of a conventional tennis ball package container surrounds and is spaced from an internal sleeve defining a storage space on the interior thereof wherein a closure assembly is provided to initally hermetically seal a plurality of tennis balls within the storage space and after removal, the closure assembly is further structured to provide fluid communication with liquids maintained within the storage space for drinking thereof.

4 Claims, 6 Drawing Figures

CONVERTIBLE TENNIS BALL CONTAINER

BACKGROUND OF THE INVENTION

1. Field of the Invention

This invention relates to a container and package for a plurality of stacked tennis balls stored therein for retail sale which is specifically structured to be convertible into a drinking vessel upon removal of the tennis balls wherein liquid, such as water, may be stored for consumption during play.

2. Description of the Prior Art

For many years, tennis balls have been packaged for retail sale and subsequent storage in an elongated cylindrical "can" or metal container. Typically, the plurality of balls are arranged in sets of three or four and are disposed in a stacked orientation within the container and along its length. Originally, the plurality of balls are packaged under a negative pressure or hermetic seal so as to maintain the freshness or "liveliness" of the balls for play. This method of packaging and storage has been found to be efficient and acceptable both to the distributor and to ultimate consumer.

It is of course well known that the game of tennis is an active sport requiring prolonged physical exertion most frequently in direct exposure to the sun. Accordingly, it is of course common with tennis, as well as many other sports, for the players to become thirsty due to the expenditure of fluids from their body during continuous play.

However, it is inconvenient for the players to interrupt play, even at a relatively convenient time, such as after a set, to travel to facilities, such as a clubhouse, locker room, etc. for water or liquid refreshment. This not only interrupts play, but frequently results in players losing a court when the facilities are crowded or very busy.

Accordingly, there is a need for a convenient container capable of storing liquid and maintaining a temperature thereof through the provision of thermal insulation of the liquid within a storage container. The carrying of thermal containers, commonly known as "thermos bottles" is not only inconvenient but sometimes impractical due to the fact that such containers are relatively fragile and may be hit by a ball or otherwise dropped causing damage thereto or destruction thereof.

In addition, tennis players are frequently extremely enthusiastic about their sport and so-called novelty items or paraphernalia associated with the sport are frequently very popular. Therefore, it is believed that there would be a need and demand for a container assembly initially utilized for the retail packaging and storage of a plurality of tennis balls in a hermetically sealed environment such as a storage container, which, after removal of the balls for play such container could be converted into a drinking vessel. Liquid may be stored in the same storage space as initially occupied by the tennis balls and wherein the structure of the container assembly is such as to at least partially thermally separate the storage space from the remainder of the housing thereby maintaining a reduced or preferred temperature of the liquid for a prolonged period.

There is of course an awareness that prior art containers capable of holding liquids or food products in a thermally isolated manner are well known. U.S. patents disclosing structures generally representative of thermally insulated containers include Komeda, U.S. Pat. Nos. 4,427,123; Grenell, 4,444,324; Blow, 4,054,205 and Witt, 4,164,284.

SUMMARY OF THE INVENTION

The present invention relates to a packaging and storage container structured to initially maintain a plurality of tennis balls on the interior thereof in a stacked array wherein the tennis balls are packaged under a negative pressure or hermetically sealed to maintain the freshness thereof. In addition, the subject container assembly is specifically structured to be converted into a storage and drinking vessel for liquid refreshment, such as water or any applicable liquid upon removal of the balls from the container such as during playing, etc.

The container assembly comprises a housing having an elongated cylindrical configuration including a closed end and an oppositely disposed open end. In addition, an elongated sleeve is fixedly mounted on the interior of said housing wherein the sleeve has a corresponding configuration but somewhat smaller dimension both longitudinally and transversely such that the sleeve is spaced from the interior surface of the housing over at least a majority of its length.

The interior of the sleeve comprises a storage space in which both the tennis balls and the liquid are stored, respectively. The internal diameter of the sleeve is consistent throughout its length and is at least minimally greater than the corresponding transverse dimension or diameter of a conventionally sized tennis ball. Typically, tennis balls whether used for professional or amateur play are of a standard size. Therefore the transverse dimension of the interior of the sleeve is such as to allow passage of a plurality of balls therein so as to be relatively oriented in a stacked array. However, the minimally greater transverse dimension of the sleeve is such as to permit only a slight transverse movement of the balls thereby reducing almost to the point of elimination any "rattling" of the ball within the storage space of the sleeve due to transverse movement of the ball and repeated contact with the interior surface of the sleeve or storage space.

Another important feature of the present invention enabling use of the subject container assembly as both a ball storage and packaging structure and a liquid storage and drinking vessel is the closure assembly associated therewith. More specifically, the closure assembly includes a first closure structure in the form of a flexible yet semi-rigid material disk secured in airtight engagement over an open end leading into the storage space or interior of the sleeve. This first closure element is secured in place by a frangible or weakened seam extending continuously about the periphery of the disk wherein adequate force exerted on the disk by gripping will cause severing and separation of the plate from its covering position and a breaking of the frangible seam.

Once removed, the first closure structure is discarded and the balls may be easily removed from the interior of the storage space. The closure assembly, however, further includes a second closure structure in the form of a cap disposed in covering relation to the housing and the open end of the sleeve. This second closure structure includes a drinking spout including an interior passage therethrough providing fluid communication and directed liquid flow from the interior of the storage space out through the end of the drinking spout. The drinking spout may be specifically designed and configured to be placed in the mouth of a person for consumption of the liquid in the interior of the storage space. The fact that the sleeve is maintained in spaced relation to the interior of the housing enables the formation of a thermally insulating space which may be a layer of air or alternately a vacuum maintained therein. Accordingly, the liquid maintained in the storage space is maintained for a prolonged period at a preferred reduced temperature.

The invention accordingly comprises features of construction, combination of elements and arrangement of parts which will be exemplified in the construction hereinafter set forth and the scope of the invention will be indicated in the claims.

BRIEF DESCRIPTION OF THE DRAWINGS

For a full understanding of the nature of the present invention, reference should be made to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
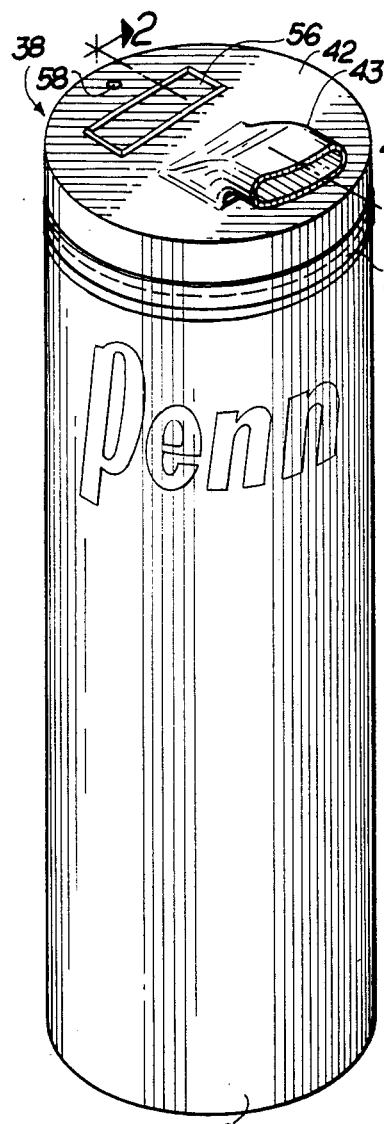
FIG. 1 is an isometric view of the subject container assembly being representative of a conventional retail packaging and storage container for tennis balls.

As shown in FIGS. 1-6, the present invention is directed to a container assembly generally indicated as 10 including a housing having an elongated cylindrical configuration and a continuous closed side wall 12. The housing 10 further includes a first closed end 14 structured so that the container assembly 10 may rest on a supporting surface in an upright orientation such as shown in FIG. 1. The housing 12 includes an open second end 16 providing access to a hollow interior portion thereof extending along the length of the housing 12 between the closed first end 14 and the open second end 16.

Further structural features of the present invention include an elongated sleeve 20 fixedly secured to extend into the interior portion 15 substantially along the entire length of the housing 12. This sleeve includes a closed end 22 disposed substantially adjacent to the closed first end 14 of housing 12. The sleeve 20 also includes an open end generally indicated as 24 disposed substantially adjacent to the open second end 16 of the housing 12.

Figure 2:
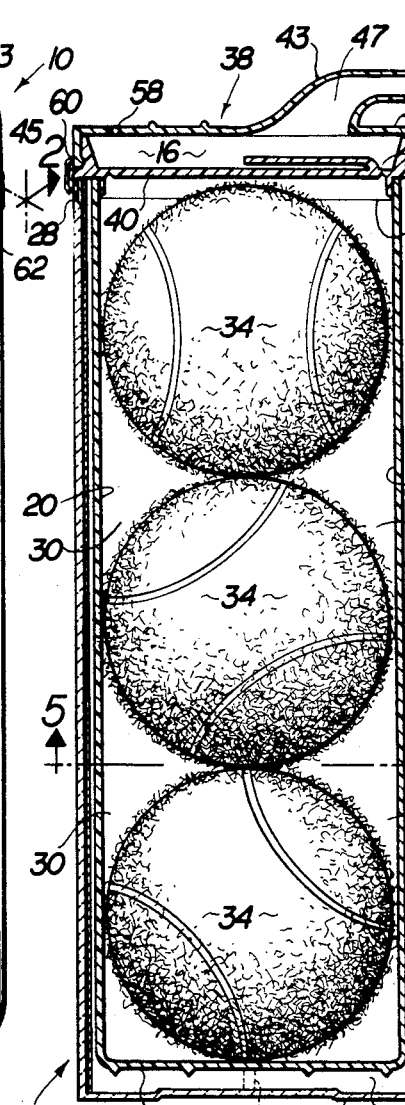
FIG. 2 is a sectional view along line 2—2 showing the interior contents of the container assembly being a plurality of conventional balls disposed in a stacked array.
Figure 3:
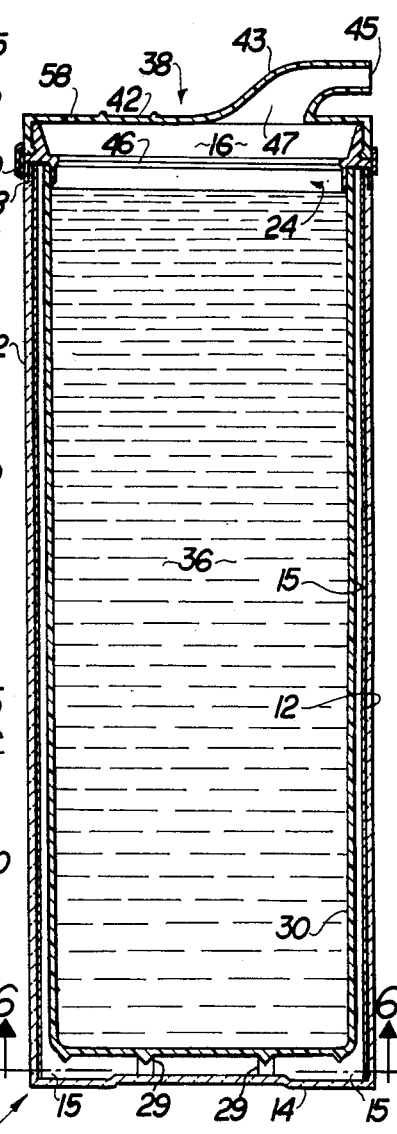
FIG. 3 is a longitudinal sectional view of the container of FIG. 1 wherein the contents thereof is liquid.
Figure 4:
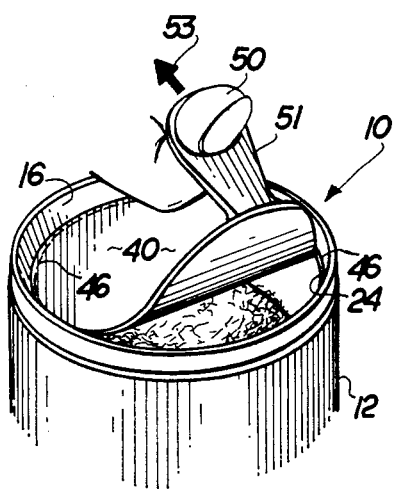
FIG. 4 is an isometric view in partial cutaway showing removal of a portion of the closure assembly of the present invention exposing the interior and contents of the subject container assembly.
Figure 5:
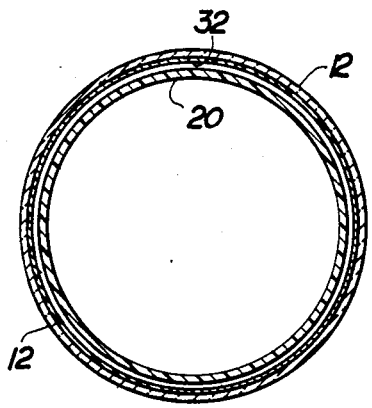
FIG. 5 is a sectional view along line 5—5 of FIG. 2.
Figure 6:
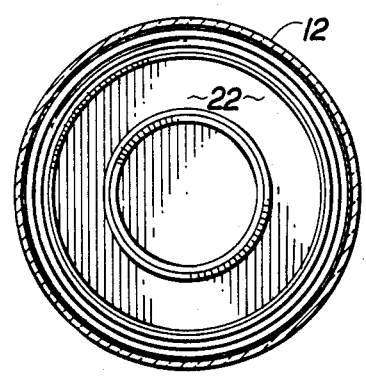
FIG. 6 is a sectional view along line 6—6 of FIG. 3.

The sleeve 20 is fixedly secured on the interior of housing 12 by a fixed connection as at 28 immediately adjacent to the open end 24 of sleeve 20. Supplementary bracing supports 29 indicated in FIGS. 2 and 3 are also be provided, if desired, to add to the structural integrity of the spaced interconnection between the sleeve 20 and the interior of the housing 12. As shown, supplementary bracing structures 29 are disposed to fixedly interconnect the closed end 22 of the sleeve 20 to the closed end 14 of the housing 12 and maintain the space 15 therebetween.

The spacing 15 substantially surrounding the sleeve 20, except where the sleeve 20 is connected as at 28 to the housing, may define a thermal insulating layer of air or alternately may be a vacuum, upon construction. The purpose of the spacing 15 therefore is to increase the thermal insulation of the contents of the sleeve 20 and more specifically the storage space 30 defined on the interior of the sleeve 20. Another structural feature of the present invention which may be included is an airimpermeable coating 32 which may cover the entire inner surface of the hollow interior portion of the housing 12 so as to add to the maintenance of the air layer and/or vacuum maintained within the spacing 15 between the interior surface of the housing 12 and the exterior surface of the sleeve 20.

The sleeve 20 is specifically dimensioned to have a consistent circular cross-sectional configuration along its length and the diameter or transverse dimension of the sleeve 20 is such as to be minimally greater than the diameter or transverse dimension of a conventionally sized tennis ball 34. The exact dimension of the interior diameter or transverse dimension of sleeve 20 is such as to be equal to the internal diameter of a conventional tennis ball can and such that "rattling" of the tennis balls within the can due to transverse movement thereof is almost entirely eliminated or seriously reduced. Also, it should be obvious that the transverse dimension of the sleeve is somewhat less than the transverse dimension of the interior of the housing so as to maintain spacing 15 therebetween and provide the insulating characteristic of the structure when water or like liquid 36 is maintained within the storage space 30.

Another important feature of the present invention is the provision of a closure assembly generally indicated as 38 and including a first closure structure 40 and a second closure structure 42. The first closure structure 40 is in the form of a semi-rigid yet somewhat flexible plate secured in air-tight or sealing engagement across the open end 24 of the sleeve 20 so as to maintain the contents thereof, in this case tennis balls 34 in a hermetically sealed state. The first closure structure 40 or plate may be removed by virtue of severing a frangible seam 46 which is weakened to separate when external pressure, as by finger, 50 is applied to a grip element 51 in an outward direction as indicated by directional arrow 53. The application of such force serves to tear away the plate or first closure structure 40 from its sealing engagement relative to the open end 24 of sleeve 20. The closure assembly 38 further includes the second closure structure 42 in the form of a cap-like cover connected to and mounted across the open second end 16 of the housing and also the open end 24 of sleeve 20. The second closure structure 42 is applicable and utilized once the plate or first closure structure 40 is removed and discarded. Also once the balls 34 are removed from the storage space 30, it may be filled with water or like consumable liquid for storage therein. Inadvertent removal or spillage from the storage space 30 is restricted by the covering position of the second closure structure 42.

As clearly shown in FIGS. 1, 2, and 3 the second closure structure 42 includes a drinking spout 43 being integrally formed on the closure and having an access aperture 45 and a passage 47 contained on the interior thereof. The passage 47 establishes fluid communication and directs liquid flow from the interior of storage space 30 out through the passage 47 to the exit aperture 45 and into a user's mouth. Suffice it to say that the drinking spout 43 is dimensioned and disposed to fit within a person'mouth so as to facilitate emptying of the liquid 36 from the storage space 30. In addition, the second closure is hingedly or pivotally connected to the housing 12 by an anchor means. In the embodiment of FIG. 2, the anchor means comprises a flexible material finger 60 secured in interconnecting relation between the housing 12 and the second closure 42. In the embodiment of FIG. 1, the anchor means comprises an elongated band 62 formed in surrounding relation to the exterior surface of the housing 12 and further secured to the second closure 42 in a manner similar to that when connecting the flexible finger (FIG. 2) to the second closure 42.

In addition to the above, it should be noted that the housing as well as the sleeve may be made from a plastic, rigid material or alternately the housing 12 may be made of a material which is rigid yet different from the interior sleeve. For example, the housing 12 may be made of metal, in the conventional fashion of well known tennis ball cans and the sleeve may be made of plastic.

Other structural features associated with the subject container assembly 10 include a passage 56 specifically structured, or roughened, to receive indicia thereon such as the name of the owner of the container assembly 10. In addition, a vent aperture 58 is disposed to extend through the second closure structure 42 to provide the entrance of air venting into the interior of the storage space 30 when the liquid is being emptied therefrom through passage 47.

It is therefore to be understood that the following claims are intended to cover all of the generic and specific features of the subject invention herein described, and all statements of the scope of the invention which as a matter of language, might be said to fall therebetween.

Now that the invention has been described, What is claimed is:

1. A container assembly for tennis balls structured to be convertible into a drinking and storage vessel for liquids, said assembly comprising:
   (a) a housing having an elongated, closed cylindrical configuration and a hollow interior portion including a common circular cross-sectional configuration extending along the length thereof,
   (b) said housing including a first end having a closed configuration and an oppositely disposed second end having an open configuration,
   (c) a sleeve formed from a rigid material and having an elongated closed cylindrical configuration and being mounted on the interior of said housing and extending into and along the length of said hollow interior portion between said first and second ends and in spaced relation to an interior surface of said housing,
   (d) said sleeve having a closed end disposed adjacent and in spaced relation to said first end of said housing and said sleeve having an open end fixedly secured adjacent said second end of said housing in coaxial relation thereto,
   (e) a storage space defined on the interior of said sleeve and extending along the length thereof from said open end and in communication therewith to said closed end of said sleeve, said interior of said sleeve having a transverse circular cross-sectional configuration extending along the length thereof,
   (f) said sleeve having an internal diameter being dimensioned only minimally greater than the transverse dimension of a conventionally sized tennis ball, said internal diameter of said storage space being of sufficient size to allow passage and storage of a tennis ball along the length thereof but sufficient in size to minimize transverse movement of the tennis ball therein, said sleeve and said storage space having a longitudinal dimension sufficient to contain a plurality of conventionally sized tennis balls in a stacked, coaxial orientation relative to one another,
   (g) bracing structure means for bracing said sleeve within said hollow interior portion of said housing and being secured on the interior of said housing in interconnecting relation between said first end of said housing and said closed end of said sleeve, said closed end of said sleeve being maintained in spaced relation to said first end of said housing,
   (h) closure means connected in removable covering relation to said open end of said sleeve for blocking access to said storage space,
   (i) said closure means comprising a first closure formed of a semi-rigid yet flexible, air impermeable plate removably secured in covering relation to said open end of said sleeve on the interior of said housing in spaced relation from said second end of said housing along a frangible seam disposed about the periphery of said plate,
   (j) said closure means comprising a second closure removably mounted on said housing in covering relation to said second end thereof and in spaced, overlying relation to said open end of said sleeve and said first closure structure,
   (k) said second closure comprising a drinking spout integrally formed thereon and including a passage formed therein in communicating relation with said open end of said sleeve and said storage space when said first closure structure moves from said housing,
   (l) said drinking spout extending outwardly from an exterior surface of said second closure and being dimensioned and configured to fit within the mouth of a person and said passage extending along the length of said spout to direct liquid from said storage space to the mouth of a person,
   (m) anchor means for securing said second closure to said housing and being mounted to said housing on an exterior portion thereof, said anchor means disposed and structured to hingedly connect said second closure to said housing for selective positioning into and out of covering relation to said second end of said housing and said open end of said sleeve, and
   (n) said sleeve further structured to be liquid tight, whereby liquid may be stored within said storage space in at least partially thermally isolated relation to said housing upon removal of tennis balls from said sleeve.

2. An assembly as in claim 1 further comprising grip means for gripping said plate and applying a separating force thereto, whereby said plate is severable from covering relation to said open end of said sleeve along said frangible seam.

3. An assembly as in claim 1 wherein said anchor means comprises a band disposed in fixed and surrounding engagement to an exterior surface of said housing and pivotally connected to said second closure structure.

4. An assembly as in claim 1 wherein said anchor means comprises a flexible material finger disposed in pivotally interconnecting relation between said second closure structure and an exterior surface of said housing.

* * * * *